United States Patent [19]

Sincock

[11] 3,900,120
[45] Aug. 19, 1975

[54] PREFORMS FOR FORMING PRESSURIZED CONTAINERS

[75] Inventor: Thomas F. Sincock, Simsbury, Conn.

[73] Assignee: Monsanto Company, St. Louis, Mo.

[22] Filed: Feb. 12, 1973

[21] Appl. No.: 331,842

[52] U.S. Cl.................. 215/1 C; 150/.5; 161/116; 161/165; 206/.6
[51] Int. Cl............................ B65d 81/20
[58] Field of Search........... 215/1 C, 31; 206/.6, .7; 161/139, 402, 407, 411, 166, 165, 116, 121, 256; 150/.5

[56] References Cited
UNITED STATES PATENTS

| | | | |
|---|---|---|---|
| 2,879,818 | 3/1959 | Root | 150/.5 |
| 3,149,017 | 9/1964 | Ehrreich et al. | 161/139 X |
| 3,426,102 | 2/1969 | Solak et al. | 260/879 |
| 3,451,538 | 6/1969 | Trementozzi | 206/46 |
| 3,578,549 | 5/1971 | Cleereman et al. | 161/402 X |
| 3,643,829 | 2/1972 | Lachner | 215/1 C |
| 3,722,725 | 3/1973 | Khetani et al. | 215/1 C |
| 3,754,851 | 8/1973 | Reilly et al. | 425/387 |
| 3,784,039 | 1/1974 | Marco | 215/1 C |
| 3,800,843 | 4/1974 | Edwards | 150/.5 |
| 3,823,818 | 7/1974 | Shaw | 206/390 |
| 3,830,893 | 8/1974 | Steingiser | 264/25 |

FOREIGN PATENTS OR APPLICATIONS

| | | |
|---|---|---|
| 711,341 | 3/1970 | South Africa |
| 760,398 | 12/1969 | Belgium |

*Primary Examiner*—Harold Ansher
*Attorney, Agent, or Firm*—Michael J. Murphy

[57] ABSTRACT

A preform made of a high barrier, high strength thermoplastic material which preferably is a polymer wherein the major constituent is a polymerized nitrile-group-containing monomer, such preform having a predetermined configuration related to that of the finished container such that on stretching and blowing while at a temperature at which substantial molecular orientation occurs, a molecularly oriented container such as a bottle is obtained which is well suited for packaging consummable items, especially carbonated beverages and similar products.

7 Claims, 5 Drawing Figures

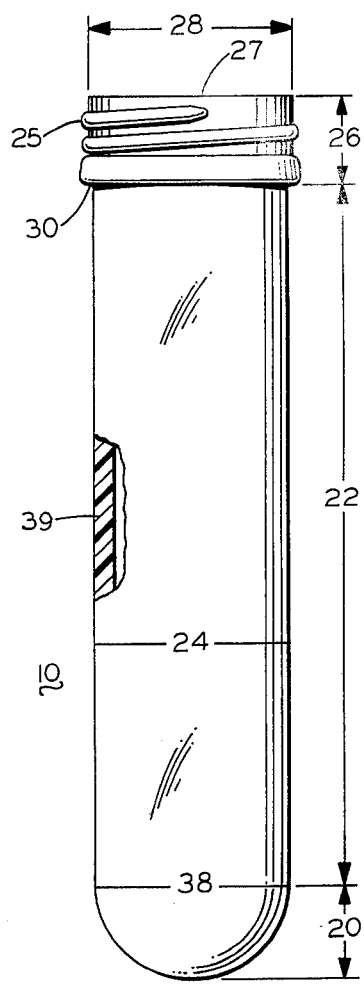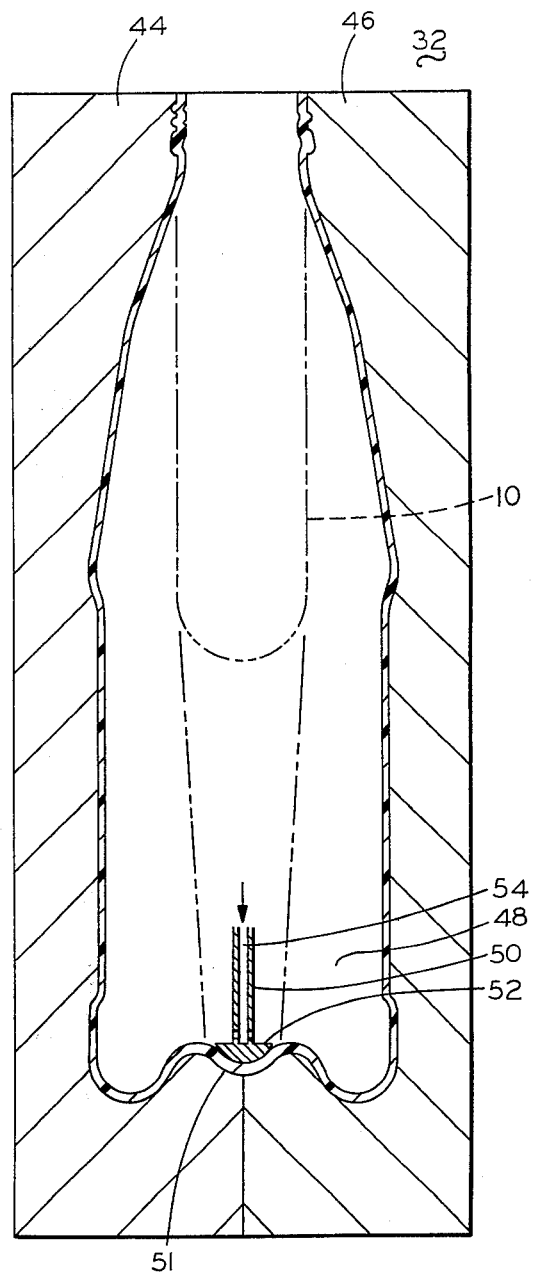
FIG. 1
FIG. 2

PREFORMS FOR FORMING PRESSURIZED CONTAINERS

BACKGROUND OF THE INVENTION

This invention relates to tubular plastic preforms and more particularly to such preforms having predetermined configurations for molding into containers for pressure and vacuum packaging of foods and beverages, and especially for holding beverages such as carbonated soft drinks, wines or beer.

It is well known in the art to form closed end tubular preforms for eventual molding into articles such as containers. Such preforms may be shaped, for example, by injection molding from molten thermoplastic material, by expanding an initial hose-like shape or parison within a blow mold or molding end portions of such shape while leaving the major part of its length unchanged, or by forcing a sheet portion into and outwardly against the walls of an open ended female cavity (thermoforming). Such preforms may be immediately molded into articles after forming and while the thermoplastic material is still in a deformable state, or alternatively they may be cooled to set the thermoplastic, removed from the preform shaping cavity, shipped to another site, reheated to molding temperature and then shaped, e.g. by blowing, into final form. This latter approach is advantageous particularly since the need for investment in an expensive extrusion installation at the site of finish forming and in the know-how associated with it is obviated, and consequently users of moderate quantities of blow molded containers can be accommodated who otherwise might not be able to justify the large investment required to produce containers at their own plant sites.

It has also recently become known in the art that beverages under superatmospheric pressure, such as carbonated soft drinks and beer, and foods under sub-atmospheric pressure can be packaged in plastic containers, provided the thermoplastic material chosen has the necessary physical and chemical properties for these rather demanding applications. For example, regarding chemical properties, the thermoplastic material of the container, at thicknesses which are economically competitive, must have barrier properties which are sufficiently high to avoid egress of components of the contents such as carbon dioxide and/or water through the wall to the atmosphere, since this would adversly affect taste. Regarding physical properties, two of the most important characteristics of the polymer forming the container are a.) impact resistance since the container must be able to withstand falls from reasonable heights without breaking, and b.) the ability to substantially retain its initial container shape over normal shelf life periods without ballooning into an unreasonable configuration.

It is likewise known that impact strength of most thermoplastic materials can be improved by molecular orientation techniques, e.g. by stretching the material while within a certain predetermined temperature range, which stretching results in an orderly alignment of the molecules in the direction of stretch, and this technique has in the past been used in blow molding processes. For example, as disclosed in U.S. Pat. No. 3,470,282, it is known to axially stretch a preform while at orientation temperature either prior to or concurrent with expansion outwardly against the walls of a blow mold, in order to develop substantial orientation in the axial direction in excess of that obtained by blowing without a separate stretching step. The impact strength of the resulting container is predictably improved to a certain extent over that blown in the conventional manner, but it has been determined that merely axially stretching and blowing a preform while at orientation temperature is not the panacea of all problems associated with forming an acceptable container for difficult packaging applications. For example, the container when in the form of a bottle filled with a beverage under pressure may after a period of time undesirably lean to one side when resting on a flat surface, or the wall thickness may have been excessively decreased during stretching so that the ability of the thermoplastic to protect the contents is inadequate, or although resistance to impact of one part of the container is adequate, it is inadequate in another part of the container, or the distribution of material in the container is sufficiently uneven that a thin portion of the container begins to bulge outwardly with respect to an adjacent thicker portion after a period of time. Heretofore, as far as is known, the critical effect of the configuration of the preform on the physical properties of a molecularly oriented container blow molded therefrom has not been recognized in the art.

SUMMARY OF THE INVENTION

Now, however, there has been developed a molded thermoplastic preform having a special, predetermined configuration designed to yield a highly functional container for packaging foods or beverages under super or sub-atmospheric pressure, and especially for packaging carbonated soft drinks and beer.

Accordingly, it is a principal object of this invention to correlate preform properties with those of a molecularly oriented container molded therefrom.

Another object of this invention is to provide a specifically configured preform designed to produce optimum properties in a molecularly oriented container blow molded therefrom.

A more specific object of this invention is to provide a preform made of a high barrier, high strength thermoplastic material which can be molded into a container having a wide range of properties necessary for successful packaging of beverages under pressure.

An additional object of this invention is to provide such a preform which can be blow molded into such a container, the latter being ready for use without requiring further finishing on ejection from the blow mold.

A futher object of this invention is to provide a method of forming an improved molecularly oriented container.

Other objects of this invention will in part be obvious and will in part appear hereinafter.

These and other objects are accomplished by providing a tubular preform for molding into a container having at least a molecularly oriented base portion, the preform being formed of a polymer wherein the major constituent is a polymerized nitrile-group-containing monomer, the preform having a substantially spherical bottom, an elongated body having a variation in wall thickness in the circumferential direction in a horizontal plane no greater than 20 percent, and a finished neck portion at the upper end of the body, the diameter of the neck portion being slightly greater than that of the body, thereby forming a ledge for supporting the preform in a mold during formation of the container, the length of the preform below the neck being between 40 to 77 percent of the axial length of the bottle below its neck.

The container is formed by molding such preform as just described, bringing the preform to a temperature at which substantial orientation occurs on stretching, which in the case of the nitrile-group-containing polymer is between 230° to 320° F., supporting such preform while at such temperature within a blowing cavity of a closed blow mold, stretching the portion of the preform below the neck by from 40 to 77 percent in the axial direction against the closed end of the cavity and then expanding the thus axially stretched preform outwardly against the walls of the cavity to form the container.

BRIEF DESCRIPTION OF THE DRAWINGS

In describing the overall invention, reference will be made to the accompanying drawings wherein:

FIG. 1 is a front view of a novel preform of the present invention;

FIG. 2 is a schematic, sectional view depicting the blow molding of a bottle from the preform of FIG. 1;

DETAILED DESCRIPTION OF THE INVENTION

Figure 3:
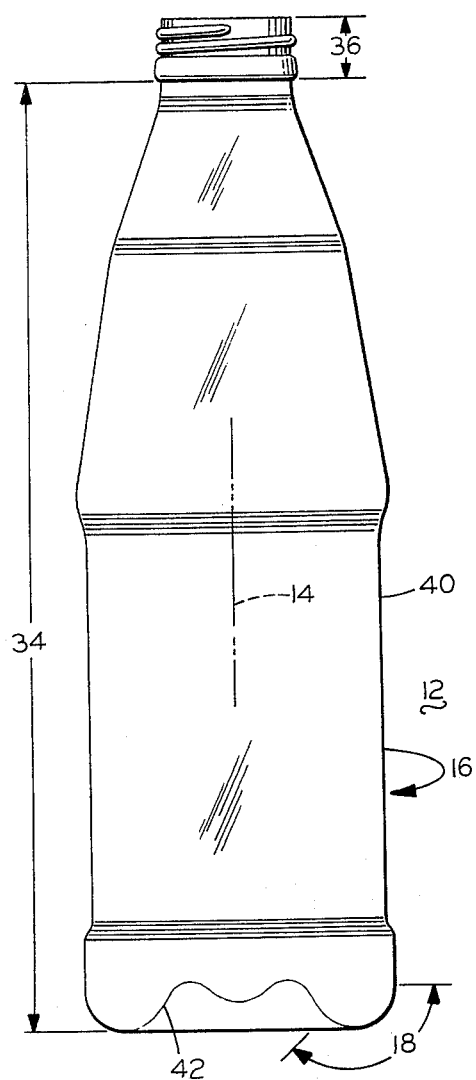
FIG. 3 is a front view of the bottle formed in FIG. 2.

The thermoplastic material from which the preforms and containers of the present invention are made must have high barrier and strength properties. As used herein, "high barrier" polymers mean those having an oxygen permeability characteristic of no greater than 10 cc./ 24 hours/100 sq. in./mil-atm. at 73° F. and a water permeability characteristic of no greater than 7 grams/24 hours/100 sq. in./mil. at 100° F. (100 percent R.H.). Sinilarly, "high strength" polymers as used herein means those exhibiting a tensile strength of at least 8,000 psi. Suitable high barrier, high strength thermoplastic polymers comprise those wherein the major constituent (at least 55 weight percent) is a polymerized monomer exhibiting the aforementioned characteristics.

Typical of specific materials suitable for use in the invention include polymerized nitrile-group-containing monomers such as acrylonitrile, methacrylonitrile, ethacrylonitrile, propacrylonitrile, alphachloroacrylonitrile, alpha-bromoacrylonitrile, alpha-fluoroacrylonitrile, alpha-cyano-styrene, vinylidene cyanide, alpha-cyano acrylic acids, alpha-cyano acrylates such as alpha-cyano methyl acrylates, alpha-cyano ethyl acrylates, and the like, 2,3-dicyanobutene-2, 1,2-dicyanopropene-1, alpha-methylene glutaronitrile, and the like. The preferred nitrile-group containing monomers are acrylonitrile and methacrylonitrile, with a level of from 60 to 85 weight percent being preferred for acrylonitrile based materials and from 85 to 95 weight percent being preferred for methacrylonitrile based materials. Obviously minor proportions of either of these monomers may be included in a polymer wherein the major constituent is the other monomer.

Any monomer or monomers which are copolymerizable with the nitrile-group-containing component may be employed. Exemplary of such monomers are ethylenically unsaturated aromatic compounds such as styrene, alpha-methyl styrene, ortho-, meta-, and para-substituted alkyl styrenes, e.g., ortho-methyl styrene, ortho-ethyl styrene, para-methyl styrene, para-ethyl styrene, ortho-, meta-, or para- propyl styrene, ortho-, meta-, or para-isopropyl styrene, ortho-, meta-, para-butyl styrene, ortho-, meta-, or para- secondary butyl styrene, ortho-, meta-, or para- tertiary butyl styrene, etc., alpha-halogenated styrene, e.g., alpha-chlorostyrene, alphabromostyrene, ring-substituted halogenated styrenes, e.g., ortho-chlorostyrene, para-chlorostyrene, and the like; esters of ethylenically unsaturated carboxylic acids e.g., methyl acrylate, methyl methacrylate, ethyl methacrylate, ethyl acrylate, butylacrylate, propyl acrylate, butyl methacrylate, glycidol acrylate, glycidol methacrylate, and the like, ethylenically unsaturated acids, carboxylic acids such as acrylic acid, methacrylic acid, propacrylic acid, crotonic acid, critaconic acid, and the like. Vinyl esters e.g., vinyl formate, vinyl acetate, vinyl propionate, vinyl butyrate, etc.; vinyl and vinylidene halides, e.g. vinyl chloride, vinyl bromides, vinylidene chloride, vinylidene chloride, vinyl fluorides, etc., viny ethers, e.g., methyl vinyl ether, ethyl vinyl ether, alph-olefins, e.g., ethylene, propylene, butene, pentene, hexene, heptene, oxtene, isobutene, and other isomers thereof. Styrene is the preferred copolymerizable monomer with nitrile-group-containing materials.

This invention also contemplates the use of minor amounts (5–10 weight percent) of synthetic or natural rubber components such as, for example, polybutadiene, butadiene-styrene copolymers, isoprene, neoprene, nitrile rubbers, acrylate rubbers, natural rubbers, interpolymers of butadiene with acrylonitrile, methacrylonitrile, tertiary butyl styrene, styrene and mixtures thereof such as acrylonitrile-butadiene copolymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitriletertiarybutyl styrene-butadiene terpolymers, ethylene-propylene copolymers, chlorinated rubbers, etc., which if used to strengthen or toughen the materials prepared from the compositions of this invention. This rubbery component may be incorporated into the polymers by any of the methods which are well known to those skilled in the art, e.g., direct polymerization of monomers, polyblends, grafting the monomer mixture onto the rubbery backbone, physical admixture of the rubbery component, etc.

Also suitable for use as high strength, high barrier polymers are those based on polymerized vinyl chloride, preferably plasticizer free, and polymerized vinylidene chloride. Also, polyethylene terephthalates wherein at least a.) about 97 weight percent is composed of repeating units of ethylene terephthalate, and b.) copolymers of ethylene terephthalate, in which up to 10 mole of the copolymer come from monomer units of diethylene glycol, propane-1, 3-diol, butane-1, 3-diol, butane-1, 4-diol, polytetramethylene glycol, polyethylene glycol, polypropylene glycol, 1,4-hydroxymethylcyclohexane and the like, replacing a part of the glycol fraction of the copolymer, or isophthalic, dibenzoic, naphthalene-1, 4- or -2, 6-dicarboxylic, adipic, sebacic, decane-1, 10-dicarboxylic acid and the like replacing a part of the acid fraction of the copolymer.

Figure 4:
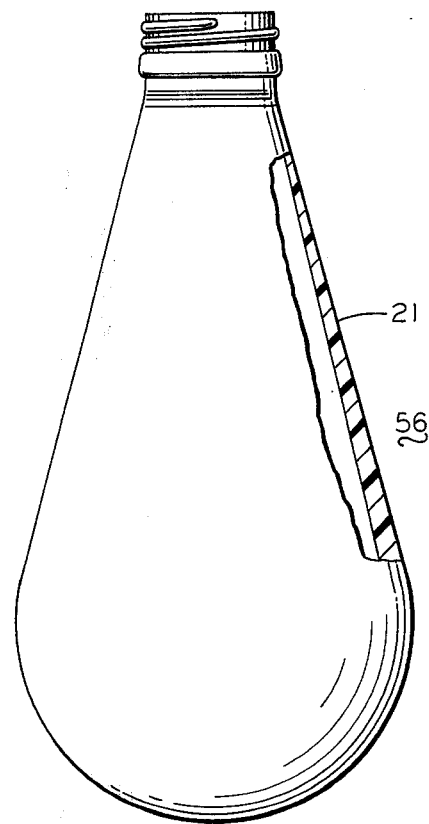
FIGS. 4 and 5 are elevational views, partly in section in FIG. 4, of alternative preform shapes.

In FIG. 1, there is illustrated a one-piece preform 10 made of a high barrier, high strength thermoplastic material, such as a 70/30 weight percent acrylonitrile/styrene copolymer, for molding into a molecularly oriented bottle 12 (FIG. 3) having substantial and relatively balanced orientation in the axial (14) and circumferential (16) directions at least in the base area 18 of cylindrical bottle 12. Though a bottle wherein the height is substantially greater than the diameter is illustrated in the embodiment of FIG. 3 and is the preferred finished container configuration, it should be realized that alternative configurations are within the scope of the invention, such as wide mouth jars, cans, jugs, tubs etc. having either cylindrical or alternative cross sectional shapes, e.g. oblong or square, or combinations of the latter in the same container. Preform 10 comprises a shaped lower end, e.g. a substantially spherical bottom 20, an elongated body 22 which in the illustrated embodiment of FIG. 1 is straight walled, but alternatively could be tapered along its length as at 21 in FIG. 4. Body 22 has a variation in wall thickness in the circumferential direction taken at any particular horizontal plane 24 along its length no greater than ± 10 percent or 20 percent overall. This tolerance is important in the present invention because of the manner in which the container is to be molded therefrom, to be more fully described hereafter. Neck portion 26 is at the upper end of body 22 and is in finished form in that it has closure engaging surfaces such as threads 25 and a substantially flat planar end face 27 which will be preserved without change during molding of the container and will be used to seal the latter through cooperation with a suitable closure means. Surface 27, however, may have a slight draft angle with the horizontal of about 5° to facilitate mold release when being formed by blow molding. Neck portion 26 has a diameter 28 slightly greater than that of body 22, thereby forming ledge 30 for positively supporting preform 10 in mold 32 in the manner illustrated in FIG. 2 during formation of bottle 12. The length of preform 10 including spherical bottom 20 below neck portion 26 (i.e., 20 plus 22 in FIG. 1) must be between 40 to 77 percent of the axial length 34 of bottle 12 below its neck portion 36 in order to develop the desired molecular orientation pattern in such bottle.

Preform 10 may be formed by any of the conventional plastic shaping processes such as injection molding, thermoforming from sheet material, compression molding, blow molding, rolling etc. Subsequent to its formation, the thermoplastic material is preferably allowed to cool and thereby set, whereupon the preform is shipped to another site for molding into bottle 12 in the manner illustrated in FIG. 2. Any waste flash material formed concurrently with preform 10 is preferably removed at the preform molding location so that no further finishing is necessary after forming bottle 12.

Referring now to FIG. 2, mold 32 comprises mating opposing sections 44, 46 which, when in closed position, form cavity 48, the periphery of which corresponds to the contour of bottle 12. As illustrated, sections 44 and 46 are closed on preform 10 by means well known to those in the art such that the preform is supported at ledge 30 by a suitable opposing surface in each section of mold 32, but prior to this the thermoplastic throughout its full wall thickness 39 must be increased in temperature (or decreased as the case may be depending on the initial starting temperature) to that at which substantial molecular orientation occurs on stretching. For substantially amorphous polymers such as the nitrile-based materials, such temperature as used herein lies within a range between the glass transition temperature Tg (second order transition temperature) of the polymer plus 100° F. Such range is 230° to 320° F. for polymers wherein the major constituent is a polymerized nitrile-group-containing monomer such as acrylonitrile. Neck portion 26, however, must be at a much lower temperature, i.e., in a substantially non-deformable state, since, as mentioned, it is desirable to preserve the configuration of the neck portion unchanged during the bottle blowing step. After mold 32 is closed, rod member 50 is actuated in the axial direction by suitable means, not shown, so as to bring foot 52 against the inner surface of spherical end 20 of preform 10, and thereafter stretch body 22 vertically until end portion 20 abuts the opposite end surface of the closed blow mold. Simultaneously with but preferably immediately thereafter and while the bottom of the preform is held against the base of the mold cavity, air under pressure is admitted to the interior of stretched preform 10, e.g. through bore 54 in rod member 50 or alternatively through the top of the mold, so as to expand the preform outwardly against the walls of cavity 48 thereby forming bottle 12. A suitable seal, not shown, must be established between the top of the preform and rod member 50 during such blowing to allow pressure buildup in cavity 58. After elapse of a suitable short time interval during which the thermoplastic is allowed to remain in contact with the walls of cavity 48 which are being cooled by a suitable conventional cooling medium circulated through mold sections 44 and 46, the latter sections are moved apart and the finished article or bottle 12 is ejected from blow mold 32 in a finished form ready for filling with the intended food or pressurized beverage contents and for subsequent capping or closuring.

The level of orientation achieved in a container such as bottle 12 is a function of several interrelated variables which relate to the preform configuration and the processing conditions for molding the bottle. The overall length of preform 10 which is considered to be that of body 22 plus end portion 20 in FIG. 1, relative to the overall length of the bottle 12 to a large extent defines the amount of axial orientation which can be obtained in the finished container. If such axial orientation is excessive, the bottle will be weak in a direction perpendicular to axis 14, whereas if it is insufficient the bottle will be deficient in strength in the axial direction. Preform length, however, is also a factor in compensating for orientation relaxation in the "Y" or axial direction which is known to occur in the plastic in the fraction of a second during and just after axial stretching and during blowing in the circumferential direction. In other words, other considerations a side for the moment, the more axial orientation developed, the more will be retained after relaxation during the subsequent phases of the forming process. It has also been found that there is a certain definable minimum length of preform below which it is not possible to go when the plastic forming the preform is initially extruded through the annular orifice of a rather conventional extrusion head. Such parison, of course, must be sufficiently thick, or in other words the grams per inch of parison length must be sufficient, to provide enough plastic for eventually forming the finished container without generating flash on closing the mold. With the foregoing restrictions in mind, (i.e., minimum length with respect to forming from a tubular parison and developing excess or insufficient axial orientation in the finished container) it has been found that the amount of stretch of the preform in the axial direction when forming a bottle such as that illustrated in FIG. 3 should be between 1.3 to 2.5 as measured by the ratio of the length of bottle 12 below its neck 36 to the corresponding preform length below neck portion 26. In addition to having difficulty forming a parison which is sufficiently thick to provide enough material to form bottle 12 if the aforesaid ratio increases above 2.5, the stretch rod frequently has been found to punch a hole in the bottom of the preform when bottle forming is according to the previously described techniques. For most commercial container configurations, and especially for bottle shapes, the preform length should be between 40 to 77 percent of the length of the bottle, measured in each case below the finished neck. For commercially sized cylindrical bottles (i.e., 10, 12, 32 and 48 ounce capacity) for holding carbonated beverages and beer, the length of the preform body below the neck portion should be between 3 to 9 inches.

The preform diameter relative to that of the container is of course likewise important since it defines the level of circumferential orientation achievable during the blowing step, or in other words the orientation in the hoop direction. This of course will vary with the particular configuration of the container and specifically with the overall diameter of the container along its length. If the preform diameter is too low with respect to bottle diameter, preferential orientation will be developed in the circumferential direction at the expense of strength or orientation in the axial direction, whereas if such axial orientation is too great the reverse is true. For most commercial bottle configurations, the ratio of the maximum container diameter to preform diameter should be between 2.0 – 3.0 to 1.

Figure 5:
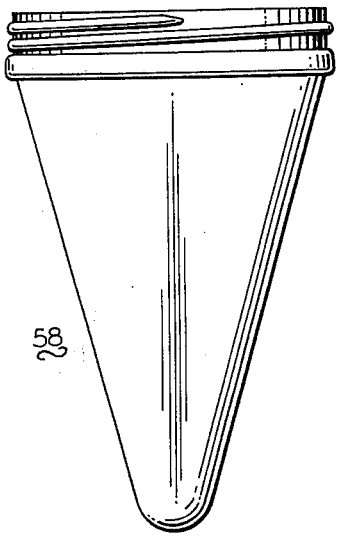

The surface contour of the preform and particularly the configuration of the closed lower end portion is likewise important in developing optimum orientation patterns in the finished container. A wide variety of unlimited shapes may be used, such as that having an increasing diameter along its length as at 56 in FIG. 4 so as to give the general initial appearance of a light bulb, or alternatively a decreasing diameter along the length as at 58 in FIG. 5, the latter being found especially suitable for a food jar type application. Similarly, it may be desirable to have substantially the entire finished body configuration of the container formed in the preform except for the lower end which would be left hemispherical and could be the only portion of the preform being shaped during final blowing. Obviously other configurations likewise could be used. The preferred end configuration found suitable to provide substantial circumferential orientation in the high stress critical base area 18 of bottle 12 is that of a hemisphere 20 smoothly merging into the vertical portion of body 22 of the preform.

The temperature of the plastic during stretching is also important and critical in obtaining the orientation to provide the improved strength in the container. Generally speaking, the temperature of the plastic for substantially amorphous polymers should be between the glass transition temperature of the polymer plus 100° F., temperatures above the latter rendering the plastic too pliable to retain the stresses generated on stretching, whereas at temperatures below the glass transition temperature, the forces necessary to stretch the material are substantial and therefore heavy and costly equipment is required.

Though the wall thickness of the preform may vary along its length, for example by utilizing conventional orifice programming means when extruding an initial tubular parison from which the preform is molded, it is preferred that the wall thickness be relatively uniform as illustrated at 39 in FIG. 1. It is conceivable, however, that for a container having a relatively large diameter base in comparison with the narrower upper end, a thickness pattern increasing along the length of the preform as at 21 in FIG. 4 may be useful in order to properly locate in the preform the plastic which is to form the largest diameter portion of the finished container.

The tolerance on wall thickness of the preform is extremely important, especially when utilizing the preferred approach of reheating a preform to orientation temperature whiach has been previously cooled, i.e., the molding technique of utilizing satellite locations having blow molding facilities only, for molding containers from preforms shaped elsewhere at a central preform-making plant. If the wall thickness of the preform varies excessively in any given horizontal plane along its length, exposure to the temperature conditioning medium which brings the plastic to orientation temperature will result in a variable temperature distribution through the preform wall, which will in turn cause variable stretching during molding. For example, a thin and thick section exposed to the same temperature for the same time period will result in the thin section being at a greater temperature than the thicker section and consequently the thinner section will stretch more and develop more orientation than the cooler thicker section during container blowing. Though this may be somewhat compensated for by programmed heating, this variability in wall thickness in the circumferential direction is generally undesirable, and when it appears in the finished container can cause wall bulging or leaning or tilting of the container when seated on a flat surface after filling and pressurizing. Such bulging, tilting, or leaning is a result of creep of the previously oriented plastic, the thinner portion generally tending to creep more and therefore generating the off-vertical position.

The overall weight and thickness of the preform likewise can vary within wide limits depending on the finished container configuration being formed. For most commercial applications, and commercially sized containers up to about 64 ounces in volumetric capacity, the preform weight generally should be between 20 to 125 gms. and the limits on wall thickness should be between 70 to 300 mils.

Various modifications and alterations will be readily suggested to persons skilled in the art. It is intended, therefore, that the foregoing be considered as exemplary only and that the scope of the invention be ascertained from the following claims.

What is claimed is:

1. A tubular preform for molding into a container having at least a molecularly oriented portion, said preform being formed of a polymer wherein the major constituent is a polymerized nitrile-group-containing monomer, said preform having a substantially spherical bottom, an elongated body having a wall thickness of between 70 to 300 mils and a variation in wall thickness in the circumferential direction in a horizontal plane no greater than 20 percent, and a finished neck portion at the upper end of the body, the diameter of the neck portion being slightly greater than that of the body thereby forming a ledge for supporting the preform in a mold during formation of said container, the length of said preform below the neck being between 3 to 9 inches.

2. The preform of claim 1 wherein the finished neck portion has threads on its outer surface.

3. The preform of claim 1 wherein the polymer comprises 60–85 weight percent polymerized acrylonitrile monomer and 40–15 weight percent of at least one other monomer copolymerized therewith.

4. The preform of claim 1 wherein the polymerized monomer is methacrylonitrile.

5. The preform of claim 1 wherein the polymerized monomer is acrylonitrile.

6. The preform of claim 5 wherein the diameter of the body decreases along its length toward the spherical bottom.

7. The preform of claim 5 wherein the weight thereof is between 20 to 125 gms.

* * * * *